Oct. 31, 1950 R. F. FOSTER 2,528,222
COMBINATION TELEVISION AND FREQUENCY MODULATION RECEIVER
Filed Dec. 29, 1948
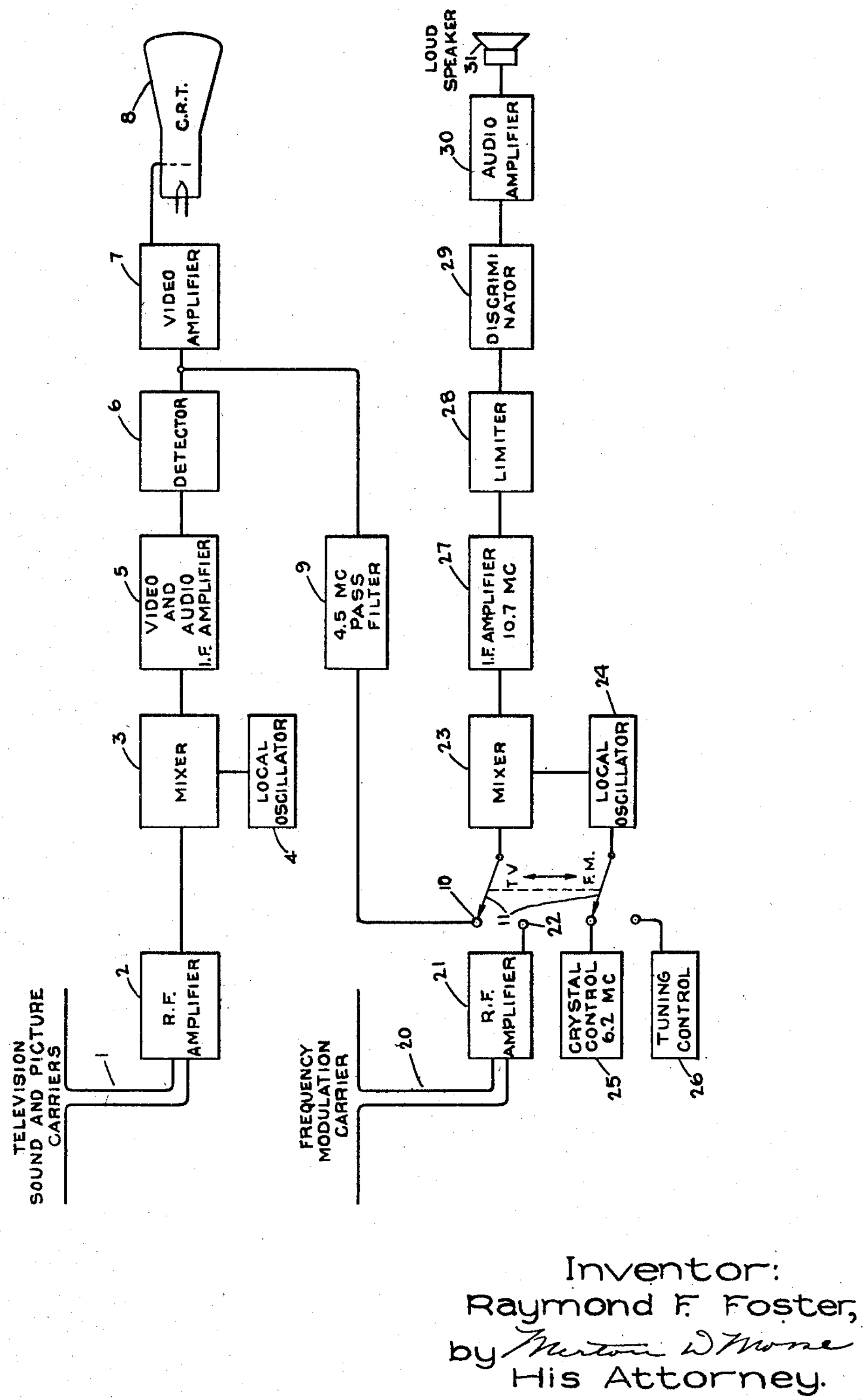
Inventor:
Raymond F. Foster,
by Merton D. Morse
His Attorney.

Patented Oct. 31, 1950

2,528,222

UNITED STATES PATENT OFFICE 2,528,222

COMBINATION TELEVISION AND FREQUENCY MODULATION RECEIVER

Raymond F. Foster, Geddes Township, Onondaga County, N. Y., assignor to General Electric Company, a corporation of New York Application December 29, 1948, Serial No. 67,837

3 Claims. (Cl. 178—5.8)

This invention relates to television and frequency modulation receivers generally, and more particularly to a system for combining various operating circuits of such receivers into a single common channel.

My invention has particular application to a type of television receiver making use of the system of television reception known as the intercarrier-sound or carrier-difference system. An intercarrier-sound receiver differs from a conventional television receiver in the utilization of a single channel for amplifying both the picture and sound carriers. Instead of following the conventional practice of completely separating picture and sound components before detection, both components are allowed to reach a second detector to produce a new intermediate frequency or intercarrier frequency from their interaction. This new intermediate frequency results from modulation of the sound or aural carrier in the presence of a picture or video carrier, separated from it in frequency by 4.5 megacycles. The specific frequency of 4.5 megacycles results from the spacing between the video and aural carriers in a television channel, as provided in the standards established by the Federal Communications Commission for black and white television systems.

The fidelity of reception in an intercarrier-sound receiver is dependent, among other factors, upon proper proportioning of the slope of the receiver acceptance curve over the frequency deviation of the sound carrier. When this has been accomplished, very little interference is caused to the sound signal by the amplitude modulation of the video carrier, the only limitation being that the modulation of the video or picture carrier must never fall below a minimum percentage, such as 10%, of its full modulation value. An intercarrier-sound receiver comprises, in addition, a 4.5 megacycle intermediate frequency amplifier, followed by a frequency discriminator for detecting the sound signal contained in the aural carrier. The remaining portions of an intercarrier system are similar to that of a conventional television receiver and comprise a cathode ray tube with sweep and synchronizing circuits for the reproduction of the picture, and an audio amplifier with a loudspeaker for the reproduction of the sound.

In an intercarrier-sound television receiver, the frequency of the intermediate carrier or intercarrier, on which the sound is superimposed as as a frequency modulation, cannot be selected at will during the design of the receiver, but is determined by the frequency difference of 4.5 megacycles between video and aural carriers in the commercial television channels. In frequency modulation receivers, that is, in receivers providing solely a sound output from stations operating in the commercial frequency modulation bands, it has become common practice to utilize an intermediate frequency of 10.7 megacycles. In order to reduce the cost of combination television and frequency modulation receivers, it is desirable to reduce the number of circuit components, and this can be accomplished by using as many of the circuits in common as possible. In accordance with my invention, I utilize a single channel to amplify and reproduce the sound signal for both the television and frequency modulation bands.

Accordingly it is an object of my invention to provide a system for utilizing a single intermediate frequency channel for the reproduction of sound in receivers operating in both the television and the frequency modulation bands.

Another object of my invention is to provide an improved circuit for converting an intermediate frequency of 4.5 megacycles, comprising the sound components in a television receiver, to an intermediate frequency of 10.7 megacycles so as to permit its reproduction through the intermediate frequency channel of an ordinary frequency modulation receiver.

For further objects and advantages and for a better understanding of the invention, attention is directed to the following description and accompanying drawing and also to the appended claims in which the features of the invention believed to be novel are more particularly pointed out.

The single figure of the drawing is a schematic diagram in simplified block form of a combination television and frequency modulation receiver embodying my invention.

Referring to the drawing, there is shown an antenna 1 which is adapted to receive a complete television signal comprising a video carrier wave, amplitude modulated with a picture signal, and an aural carrier wave, frequency modulated with a sound signal. The antenna 1 supplies the received carrier waves to a radio frequency amplifier 2 which (in turn, supplies these waves, after amplification, to a mixer 3 wherein they are combined, through the usual superheterodyning circuit, with high frequency oscillations provided by a local oscillation 4. The output voltage from the mixer 3 is supplied to an intermediate frequency amplifier 5, which may comprise one or more stages of amplification, and which has a band pass characteristic sufficiently wide to insure amplification of both the video and audio intermediate frequency carrier waves. In order to maintain the level of the video carrier at all times higher than that of the audio carrier so as to prevent interaction of the picture amplitude modulation on the sound frequency modulation at the output of the succeeding stage, the intermediate frequency amplifier 5 provides an attenuation to the aural carrier relative to the video carrier.

The standards presently established by the Federal Communications Commission require the generation at the transmitting station of sound and picture carriers separated by 4.5 megacycles. This frequency difference is not effected by the conversion of the original radio frequency carriers into intermediate frequency carriers through the operation of the mixer circuit, and accordingly the intermediate frequency carriers, after translation through circuit 5, still have a frequency difference of 4.5 megacycles. From the intermediate frequency amplifier 5, both carriers are supplied to a detector 6 to reproduce the video picture signal from the amplitude modulated waves. The detector 6 has a detection characteristic which, in accordance with well-known principles, causes a heterodyning action of the intermediate frequency picture modulated waves with the intermediate frequency sound modulated waves. Thus there results, at the output of the detector 6, a detected or rectified picture signal and also a new intermediate frequency wave or intercarrier wave at a frequency of 4.5 megacycles on which the sound signal is superimposed as a frequency modulation. The output of the detector 6 is supplied to a video amplifier 7 which may comprise a suitable filter for rejecting the intercarrier wave of 4.5 megacycles carrying the sound signal. The video amplifier 7 comprises, in addition, suitable gating, synchronizing, and sweep circuits for reproducing the picture on the screen of the cathode ray tube 8.

The detector circuit 6 also supplies its output voltages to a filter 9 which is designed to accept only the 4.5 megacycle intercarrier and the side frequencies resulting from frequency modulation thereof. The output from the filter 9 is supplied to a terminal 10 of a double-pole, double-throw switch 11. This part of the receiver system is more closely connected with the reception of carrier waves in the frequency modulation band. It comprises an antenna 20 adapted to receive carrier waves on which a sound signal is superimposed as a frequency modulation. The antenna 20 supplies the received carrier waves to a radio frequency amplifier 21, wherein the waves are amplified and thereafter supplied to a terminal 22 of the switch 11. When switch 11 is in its upper position, the output of the filter 9 is connected to a mixer circuit 23, whereas when it is in the down position the output of the amplifier 21 is connected thereto. High frequency oscillations are supplied to the mixer circuit from a local oscillator 24. A second arm of the switch 11 connects the local oscillator to a crystal control circuit 25 when the switch is in its upper position, or to a tuning control circuit 26 when the switch is in its lower position.

When the switch 11 is in its upper position, the local oscillator 24 is controlled by the crystal and supplies a voltage at a frequency of 6.2 megacycles to the mixer circuit 23. The voltage at a frequency of 6.2 megacycles supplied to the mixer combines or heterodynes with the intercarrier wave of 4.5 megacycles supplied from the filter 9, to produce a new intermediate frequency carrier at a frequency of 10.7 megacycles which is equal to the sum of the component frequencies.

In the lower position of the switch 11, the frequency modulated carrier is supplied directly to the mixer circuit while the local oscillator 24 is connected to the tuning control 26. With the switch 11 in the lower position, the receiver is adapted to receive a frequency modulated signal. The tuning control 26 is then adjusted to provide an intermediate frequency of 10.7 megacycles upon heterodyning with the frequency modulated carrier wave to be received. Various stations in the commercial frequency modulation band may be selected through suitable adjustment of tuning control 26.

The output of the mixer 23 is an intermediate frequency wave of 10.7 megacycles upon which either the sound of the television aural carrier or the sound of the frequency modulation carrier may be superimposed as a frequency modulation. Thereafter the output is supplied, after the conventional manner, to the following circuit elements connected in cascade: an intermediate frequency amplifier 27 operating at 10.7 megacycles; a limiter 28; a discriminator 29; an audio amplifier 30; and a loud-speaker 31.

In accordance with my invention, a single intermediate frequency amplifier channel is utilized for the reception of a television aural carrier and for the reception of a frequency modulation carrier. This results in a simplified circuit and permits a considerable reduction in component parts and manufacturing costs, with no impairment in the quality of reception, whether in the television band or in the frequency modulation band.

While a specific embodiment has been shown and described, it will, of course, be understood that various modifications may be made without departing from the invention. The appended claims are therefore intended to cover any such modifications within the true spirit and scope of the invention.

What I claim as new and desire to secure by Letters Patent of the United States is:

1. In a combination television and frequency modulation receiver of the type having a single intermediate frequency television channel from which is derived a television image signal and a beat frequency sound signal, the frequency of said beat frequency signal being equal to the carrier spacing of said sound and video signals, a single channel frequency modulation signal receiving circuit, means for selectively converting either said beat frequency signal or a frequency modulation signal received in said circuit to a predetermined intermediate frequency higher than said beat frequency and lower than said received frequency modulation signal comprising, a mixer circuit, first switching means for selectively connecting either said beat frequency signal to said mixer circuit for television reception or said frequency modulation signal circuit to said mixer circuit for frequency modulation reception, an oscillator circuit connected to said mixer circuit, a fixed frequency circuit, a tuning control circuit, and second switching means for selectively connecting either said fixed frequency circuit to said oscillator for television reception or said tuning control circuit to said oscillator for frequency modulation reception, said fixed frequency circuit having values such that both said beat frequency signal and said received frequency modulation signal are selectively converted to the same predetermined intermediate frequency.

2. In a combination television and frequency modulation receiver of the type having a single intermediate frequency television channel from which is derived a television image signal and a beat frequency sound signal, the frequency of said beat frequency signal being equal to the carrier spacing of said sound and video signals, a single channel frequency modulation signal receiving circuit, means for selectively converting either said beat frequency signal or a frequency modulation signal received in said circuit to a predetermined intermediate frequency higher than said beat frequency and lower than said received frequency modulation signal comprising, a mixer circuit, an oscillator circuit connected to said mixer circuit and having a fixed frequency circuit and a tuning control circuit associated therewith, and switching means operative in a first position to connect said beat frequency signal to said mixer circuit and said fixed frequency circuit to said oscillator for television reception and operative to a second position to connect said frequency modulation signal to said mixer circuit and said tuning control circuit to said oscillator for frequency modulation reception, said fixed frequency circuit having value such that both said beat frequency signal and said frequency modulation signal are selectively converted to the same predetermined intermediate frequency.

3. In a combination television and frequency modulation receiver of the type having a single intermediate frequency television channel from which is derived a television image signal and a beat frequency sound signal, the frequency of said beat frequency signal being equal to the carrier spacing of said sound and video signals, a single channel frequency modulation signal receiving circuit, means for selectively converting either said beat frequency signal or a frequency modulation signal received in said circuit to a predetermined intermediate frequency higher than said beat frequency and lower than said received frequency modulation signal comprising, a mixer circuit, first switching means for selectively connecting either said beat frequency signal to said mixer circuit for television reception or said received frequency modulation signal to said mixer circuit for frequency modulation reception, an oscillator circuit connected to said mixer circuit, a fixed frequency circuit tuned to a frequency lower than said predetermined intermediate frequency, a tuning control circuit tunable over a band of frequencies higher than said predetermined intermediate frequency, and second switching means for selectively connecting either said fixed frequency circuit to said oscillator for television reception or said tuning control circuit to said oscillator for frequency modulation reception whereby either said beat frequency signal or said received frequency modulation signal may be selectively converted to the same predetermined intermediate frequency.

RAYMOND F. FOSTER.

REFERENCES CITED

The following references are of record in the file of this patent:

UNITED STATES PATENTS

| Number | Name | Date |
|---|---|---|
| 2,155,126 | Goldmark | Apr. 18, 1939 |
| 2,186,455 | Goldmark | Jan. 9, 1940 |
| 2,448,908 | Parker | Sept. 7, 1948 |

FOREIGN PATENTS

| Number | Country | Date |
|---|---|---|
| 568,747 | Great Britain | Apr. 11, 1945 |